No. 759,931. PATENTED MAY 17, 1904.
T. L. & T. J. STURTEVANT.
APPARATUS FOR DRESSING CRUSHING ROLLS.
APPLICATION FILED NOV. 5, 1903.
NO MODEL.
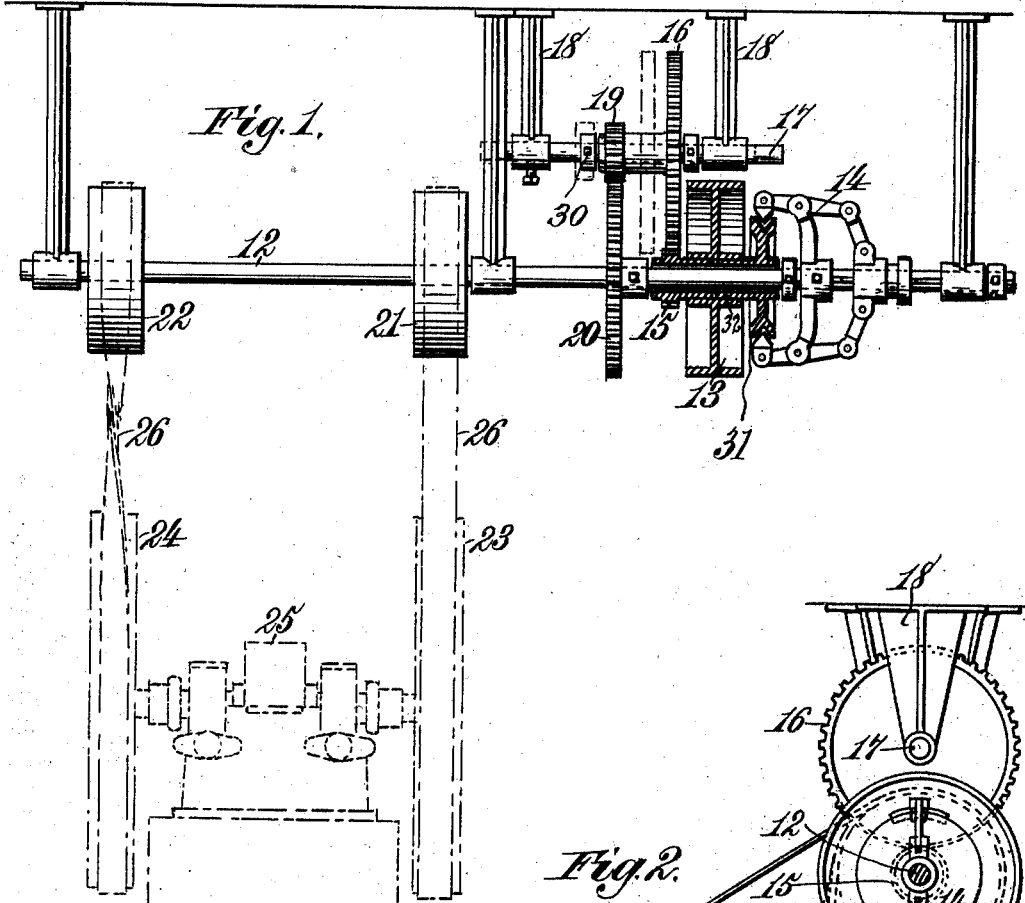
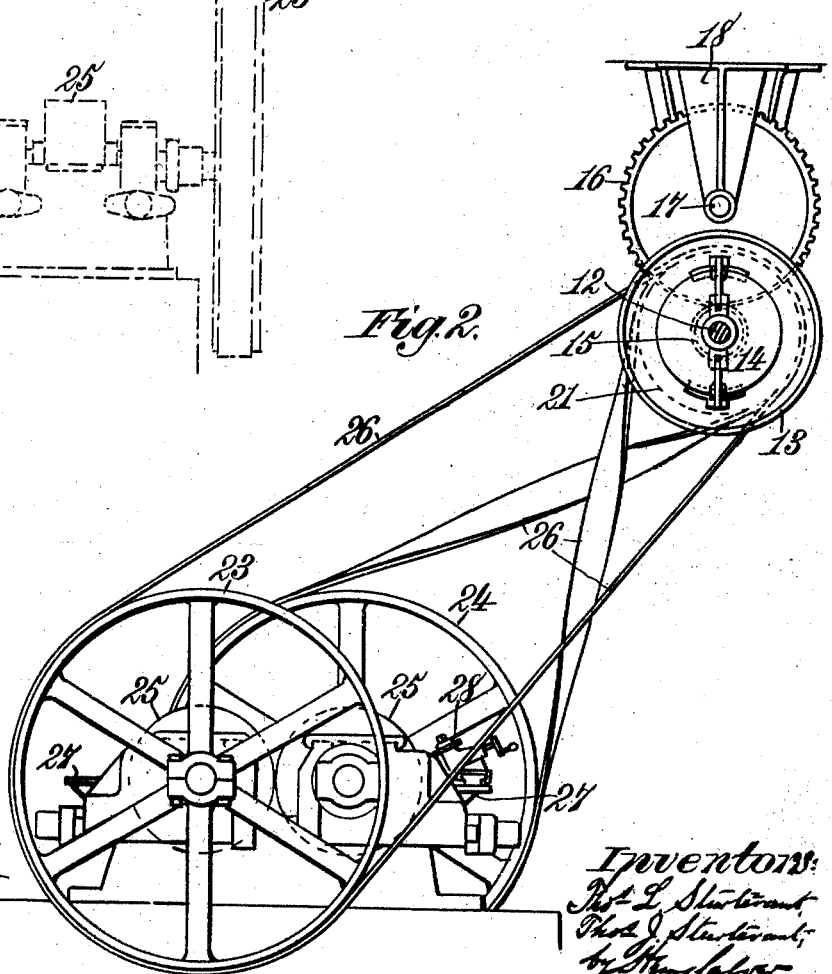

No. 759,931. Patented May 17, 1904.

UNITED STATES PATENT OFFICE.

THOMAS L. STURTEVANT, OF QUINCY, AND THOMAS J. STURTEVANT, OF WELLESLEY, MASSACHUSETTS, ASSIGNORS TO THE STURTEVANT MILL COMPANY, OF PORTLAND, MAINE, A CORPORATION OF MAINE.

APPARATUS FOR DRESSING CRUSHING-ROLLS.

SPECIFICATION forming part of Letters Patent No. 759,931, dated May 17, 1904.

Application filed November 5, 1903. Serial No. 179,932. (No model.)

*To all whom it may concern:*

Be it known that we, THOMAS L. STURTEVANT, residing at Quincy, and THOMAS J. STURTEVANT, residing at Wellesley, in the county of Norfolk and State of Massachusetts, both citizens of the United States, have invented certain new and useful Improvements in Apparatus for Dressing Crushing-Rolls, of which the following is a specification, reference being had therein to the accompanying drawings.

In the use of roll-tire crushing-machines employed for the reduction of ores and other hard substances the faces of the crushing rolls or tires require dressing or machining at times for the purpose of smoothing and truing them and for removing the irregularities in the crushing-surfaces occasioned by the wear and strain to which they are subjected. As these machines are necessarily of a ponderous character, it requires much time and labor to remove the heavy rolls from the machines for the purpose of turning down their working faces in lathes, and heavy and expensive lathes are required for turning the rolls or tires of some of these machines, owing to the ponderous character of the rolls or roll-tires the faces of which require dressing.

This invention has for its object to provide a comparatively simple and efficient mechanism by which the rolls of crushing-machines may be turned off or dressed while the rolls or tires are in their working positions in such machines, so that the operation of turning off or truing the faces of the rolls or roll-tires may be quickly and easily effected without dismantling the machines in any way or without removing the crushing rolls or tires from working position.

In our application, Serial No. 169,904, filed August 8, 1903, we show a mechanism adapted for turning off or dressing the faces of tires or rolls of crushing-machines in which the driving-pulleys of the two rolls are in line with each other on the same side of the machine and are driven by a single belt, and the present invention is intended for use with that class of roll-crushing machines in which the driving-pulleys are out of line with each other or are on opposite sides of the machine, the present invention comprising a driving mechanism by which a proper slow turning speed may be imparted to the rolls at the turning off or dressing operation from the same driving or power shaft from which the crushing-machine is driven when in use for crushing.

In the accompanying drawings, Figure 1 is a front view of an apparatus embodying our present invention, and Fig. 2 is a side view of the same.

Referring to the drawings, 12 denotes a driving or power shaft from which the crushing-machine is to be driven. This shaft 12 is provided with a loose pulley 13, to be belted to an engine or other suitable source of power, and which is connected in the ordinary running of the crusher with the shaft 12 through a friction-clutch device 14 of ordinary construction. The hub of the pulley 13 is provided with a pinion 15, meshing with a gear-wheel 16 on a shaft 17, supported in suitable hangers 18 and having a hub provided with a pinion 19, meshing with a gear-wheel 20, pinned to the shaft 12. It will be obvious that through this reducing-gearing comparatively slow rotary movement may be imparted to the shaft 12 from the driving-pulley 13 when the friction-clutch device 14 is disengaged from said pulley 13, as shown in the drawings. The shaft 12 is provided with pulleys 21 and 22, which are belted to the driving-pulleys 23 and 24 on the opposite sides of the crushing-machine, each of said pulleys 23 and 24 being fixed to a shaft carrying a crushing-roll 25. For the purpose of driving said pulleys 23 and 24 in opposite directions from the pulleys 21 and 22 one of the driving-belts 26 will be crossed, as denoted in Fig. 2.

Mounted on the frame 27 of the crushing-machine is a turning-tool device 28, which is of any ordinary or suitable construction, in that it will be provided with feed-screws for moving the turning-tool into contact with the surface to be turned and for feeding it transverse to said surface on a proper slide-rest. The turning-tool device is adapted for attachment to either end of the frame or casing of the crushing-machine, so that after one roll has been turned off or dressed the turning-tool device may be shifted to the other end of the machine for the purpose of turning off or dressing the face of the other crushing roll or tire.

When the crushing-rolls are to be driven at normal crushing speed from the shaft 12 through the friction-clutch device 14, the reducing-gearing above described will be disengaged from said shaft. This can readily be done in the construction herein shown by loosening the screw 30, which retains the gear-wheel 16 and pinion 19 in slow-speed position, and then shifting the said gear-wheel and pinion longitudinally of the shaft or rod 17 to the position denoted by dotted lines in Fig. 1. After this has been done the arms of the clutch device 14, which is splined to and rotates with the shaft 12, will be engaged with the pulley 31 on the sleeve 32, which is loose on the said shaft 12 and with which sleeve the power or driving pulley 13 is rigid, as is also the driving-pinion 15, said sleeve practically constituting a hub for the said pulley 13. When the pulley 13 is thus connected with the shaft 12 through the said clutch device, a fast speed will be imparted to the shaft 12, as will be understood. When it is desired to impart a slow motion to said shaft from the driving-pulley 13 through the reducing-gearing hereinbefore described, the clutch device 14 will be disengaged from the pulley 26, as shown in full lines in Fig. 1, and the said reducing-gearing will also be in the position shown in full lines in said figure, so that the shaft 12 will be rotated through the pinion 15, gear-wheel 16, pinion 19, and gear-wheel 20, said last-named gear-wheel being fast on said shaft 12.

From the foregoing it will be apparent that our invention comprises a simple and efficient mechanism by which the faces of the crushing rolls or tires may be quickly trued or dressed without removing the rolls or tires from the machine and by which the rolls or tires may be driven at the proper slow speeds when the faces thereof are to be turned or dressed, but which mechanism is also adapted for driving the crushing-rolls at proper speeds for their normal crushing operations.

Having thus described our invention, we claim and desire to secure by Letters Patent—

1. The combination with a crushing-machine and a turning-tool device adapted for attachment to a stationary part thereof in position so that the turning-tool may engage a crushing roll or tire, of a power-shaft from which the crushing-machine is driven, and which is so belted to the pulleys of the crushing-rolls as to drive the rolls in opposite directions with their tops turning toward each other, and a driving-pulley loose on said power-shaft, a clutch device by means of which said pulley may be connected with said shaft when the crushing-machine is to be run at crushing speed, and a reducing-gearing connecting said loose pulley with said shaft when a roll or tire is to be dressed by said turning-tool device.

2. The combination with a roll crushing-machine having a driving-pulley for each roll, of a turning-tool device adapted to be attached to a stationary part of said machine, a power-shaft provided with two pulleys belted to the pulleys of the crushing-rolls, a loose pulley on said power-shaft, a clutch device for connecting said loose pulley with said shaft when desired, and a reducing-gearing device connecting said loose pulley with said power-shaft to drive the latter at a slow speed when the crushing rolls or tires are to be dressed.

3. The combination with a roll crushing-machine having a driving-pulley for each roll, of a turning-tool device adapted to be attached to a stationary part of said machine, a power-shaft provided with two pulleys belted to the pulleys of the crushing-rolls, a loose pulley on said power-shaft, a clutch device for connecting said loose pulley with said shaft, when desired, and a reducing-gearing device connecting said loose pulley with said power-shaft to drive the latter at a slow speed when the crushing rolls or tires are to be dressed, said reducing-gearing being disconnectible from said loose pulley so that the crushing-machine may be run at higher speed for crushing operations when said loose pulley is connected with said shaft through said clutch device.

In testimony whereof we affix our signatures in presence of two witnesses.

THOMAS L. STURTEVANT.
THOMAS J. STURTEVANT.

Witnesses:
  W. T. ELLIS,
  L. H. STURTEVANT.